United States Patent
Liu et al.

(10) Patent No.: US 7,587,534 B2
(45) Date of Patent: Sep. 8, 2009

(54) KVM SWITCH SYSTEM CAPABLE OF WIRELESSLY TRANSMITTING KEYBOARD-MOUSE DATA AND RECEIVING VIDEO/AUDIO DRIVING COMMAND

(75) Inventors: Chien-hsing Liu, Shijr (TW); Wei-min Huang, Shijr (TW)

(73) Assignee: ATEN International Co., Ltd., Hsichi, Taipei Hsien ( * ) Notice: Subject to any disclaimer, the term of this patent is extended or adjusted under 35 U.S.C. 154(b) by 38 days.

(21) Appl. No.: 11/681,847

(22) Filed: Mar. 5, 2007

(65) Prior Publication Data

US 2008/0222326 A1    Sep. 11, 2008

(51) Int. Cl.
- G06F 13/12    (2006.01)
- G06F 13/28    (2006.01)
- G06T 9/00     (2006.01)
- G09G 5/02     (2006.01)
- G09G 5/00     (2006.01)

(52) U.S. Cl. .................... 710/62; 345/555; 345/603; 345/2.1

(58) Field of Classification Search .............. None
See application file for complete search history.

(56) References Cited

U.S. PATENT DOCUMENTS

2005/0052465 A1* 3/2005 Moore et al. ............. 345/603
2005/0104892 A1* 5/2005 Covington et al. ........ 345/555
2005/0204026 A1* 9/2005 Hoerl ..................... 709/223
2008/0129692 A1* 6/2008 Sween et al. ............. 345/157

* cited by examiner

*Primary Examiner*—Henry W. H. Tsai
*Assistant Examiner*—Tushar S Shah
(74) *Attorney, Agent, or Firm*—Patterson & Sheridan, LLP; Keith P. Taboada

(57) ABSTRACT

A control management system for controlling electrical devices is disclosed. The control management system comprises a plurality of electrical devices, and a keyboard-video-mouse switch. Each electrical device corresponds to a transforming unit for generating a protocol command signal, and a first protocol signal transceiver for wirelessly transmitting the protocol command signal via a communication interface. The keyboard-video-mouse switch comprises a plurality of second protocol signal transceivers, a plurality of converting modules, a plurality of system controllers, and a switch unit. Each of the second protocol signal transceiver corresponds to one of the first protocol signal transceivers and is used for receiving the protocol command signal from the corresponding first protocol signal transceiver. Each converting module, coupled to one of the plurality of second protocol signal transceivers, is used for converting the protocol command signal into a driving command. Each system controller, coupled to one of the plurality of converting module, is used for generating video/audio data stream based on the driving command. A switch unit is used for switching to a route to deliver the video/audio data stream from one of the plurality of converting modules to a display.

22 Claims, 4 Drawing Sheets

KVM SWITCH SYSTEM CAPABLE OF WIRELESSLY TRANSMITTING KEYBOARD-MOUSE DATA AND RECEIVING VIDEO/AUDIO DRIVING COMMAND

BACKGROUND OF INVENTION

1. Field of the Invention

The present invention relates to a control management system for controlling electrical devices, and more particularly, to a control management system capable of transmitting keyboard/mouse data and receiving video/audio driving command to/from an electrical device via a wireless communication interface.

2. Description of the Prior Art

A keyboard-video-mouse (KVM) switch has been developed as an important solution of multi-users, remote access and management for a network interconnecting a large number of console devices and a large number of computers thereto. A KVM extender enables a computer interface to be located at a greater distance from the computer than is typically possible with a standard interface. For example, a company can place all its employees' computers in a rack-mounted system in a locked room and yet still provide a standard KVM interface at each employee's desk. To the employee, it appears as though the computer is still located at the employee's desk. This centralization of computers enables companies to maintain tighter security over their computers and also simplifies the computers' maintenance by locating them, in a single place.

The KVM switch may be accessible over a LAN via a common protocol, such as a transfer control protocol/Internet protocol (TCP/IP). Generally, a user or system administrator can access the remote computers attached to the KVM switch utilizing an Internet browser or client software associated with the KVM switch, Once the remote computer has been selected, the remote computer's video signal is routed to workstation's video monitor of the user and a user may then utilize a keyboard and/or mouse to control the remote computer. The KVM switch may additionally include a connection to the power source of the remote computer for a hard reboot in case of a system failure. With a KVM switch, the user can access multiple computers with a single interface, thus reducing the cost of components and maintenance.

Traditionally, the keyboard, video, mouse data are transmitted and received between the KVM switch and the computers by respective cables. Also, these cables connect the computers and the keyboard-video-mouse switch through respective terminals, i.e. the video connectors (commonly, D-sub 15 pins VGA connectors), the mouse connectors and the keyboard connectors (commonly, PS/2 or Universal serial bus (USB) connectors). Once the number of the computers connected to the keyboard-video-mouse switch is more and more increased, these sets of keyboard-video-mouse cables correspondingly occupy a lot of space between the keyboard-video-mouse switch and the connected computers. Especially, the occupying space of many cables grows up for a racked, clustered computers or servers due to the less space for the setup of these computers. Meanwhile, the large number of cables required by the number of the connected computers dose not only occupy lots of spaces but also cause the bad radiation of the KVM switch, the computers and the cables themselves.

Please refer to FIG. 1, which illustrates a system of using a keyboard-video-mouse switch and a keyboard-video-mouse extender to transmit the keyboard/mouse data and receiving the video/audio data stream to/from the computer 300 and 302 with respective cables. The keyboard-video-mouse switch 30 is connected with a first workstation which contains a keyboard 32, a mouse 34 and a display 36. The display 36 is coupled to the keyboard-video-mouse switch 30 for receiving the video signals to show operation information for users. For example in a big rack, clustered computers are setup to be connected to a keyboard-video-mouse switch 30 for being remote accessed. Three cables 38 are necessary for coupling each computer to a keyboard-video-mouse switch. If twenty computers are setup, there will be sixty cables crowed in the whole rack. Additionally, the KVM switch 30 also accommodates a second workstation that may be relatively far from the KVM switch 30, for example 400 feet away. The second workstation includes a keyboard 42, a mouse 44, and a display 46. In order to accommodate the relative distance between the second workstation and the KVM switch 30, a KVM extender 40 between the second workstation and the KVM switch 30 is required. The KVM extender 40 is coupled to the KVM switch 30 via a long line 48. The line 48 may be, preferably, a CAT5 cable, or an optic fiber cable.

Furthermore, the size of the keyboard-video-mouse switch can be diminished with such idea because the number of circuitry devices inside for transceiving the keyboard-video-mouse data over single protocol standard through one single cables must less than the one for traditional designs. For instance, one set of switch devices including three selecting circuit devices for outputting/inputting keyboard, video and mouse data respectively can be replaced by one single selecting circuit devices because keyboard-video-mouse data are transmitted over single protocol standard in one single cable. Therefore, the occupation space of the keyboard-video-mouse switch also can be minified.

Consequentially, there is a need to develop a keyboard-video-mouse switch capable of wirelessly transmitting keyboard/mouse data and receiving video driving command to/from a computer. Such a system should allow a user to view all available remote computers via an on-screen user interface and to choose one of these computers to monitor and control. The system should aid in managing remote computing environments, thereby reducing the need to have an on-site system administrator.

SUMMARY OF INVENTION

It is therefore a primary objective of this invention to provide a control management system for controlling an electrical device to solve the existing problem.

Briefly summarized, the claimed invention provides a control management system for controlling electrical devices. The control management system comprises a plurality of electrical devices, and a control management unit. Each electrical device corresponds to a transforming unit for generating a protocol command signal, and a first protocol signal transceiver for wirelessly transmitting the protocol command signal via a communication interface. The control management unit comprises a plurality of second protocol signal transceivers, a plurality of converting modules, a plurality of system controllers, and a switch unit. Each second protocol signal transceiver corresponds to one of the first protocol signal transceivers, and is used for receiving the protocol command signal from the corresponding first protocol signal transceiver. Each converting module, coupled to one of the plurality of second protocol signal transceivers, is used for converting the protocol command signal into a driving command. Each system controller, coupled to one of the plurality of converting module, is used for generating data stream based on the driving command. A switch unit is used for switching to a route to deliver the data stream from one of the plurality of converting modules to a console device.

In one aspect of the present invention, a keyboard and/or a cursor control device is coupled to the control management unit. The keyboard is used for generating a keyboard control signal, and the cursor control device is used for generating a cursor control signal. The switching unit further switches to another route to deliver the keyboard control signal from the keyboard to one of the plurality of electrical devices, or switches to another route to deliver the cursor control signal from the cursor control device to one of the plurality of electrical devices. The console device comprises a display and/or a mouse.

In another aspect of the present invention, the communication interface is selected from a group consisting of a Bluetooth wireless network, an 802.11 series wireless network and a wireless USB interface.

According to the claimed invention, a control management system for controlling an electrical device, the control management system comprises an electrical device and a control management unit. The electrical device corresponds to a transforming unit for generating a protocol command signal, and a first protocol signal transceiver for wirelessly transmitting the protocol command signal via a communication interface. The keyboard-video-mouse extender comprises a second protocol signal transceiver, a converting module, and a system controller. The second protocol signal transceiver is used for receiving the protocol command signal from the first protocol signal transceiver. The converting module is used for converting the protocol command signal into a driving command The system controller, coupled to the converting module, is used for generating data stream based on the driving command and outputting the data stream to a console device.

In one aspect of the present invention, a keyboard and/or a cursor control device is coupled to the control management unit. The keyboard is used for generating a keyboard control signal, and the cursor control device is used for generating a cursor control signal. The switching unit further switches to another route to deliver the keyboard control signal from the keyboard to one of the plurality of electrical devices, or switches to another route to deliver the cursor control signal from the cursor control device to one of the plurality of electrical devices. The console device comprises a display and/or a mouse.

In another aspect of the present invention, the communication interface is selected from a group consisting of a Bluetooth wireless network, an 802.11 series wireless network and a wireless USB interface.

According to the claimed invention, a control management system for controlling electrical devices comprises a plurality of electrical devices, and a console. Each electrical device corresponds to a transforming unit for generating a protocol command signal, and a first protocol signal transceiver for wirelessly transmitting the protocol command signal via a communication interface. The console comprises a housing, a plurality of second protocol signal transceivers, a plurality of converting modules, a plurality of system controllers, a switch unit, and a display. Each second protocol signal transceiver corresponds to one of the first protocol signal transceivers, and is used for receiving the protocol command signal from the corresponding first protocol signal transceiver. Each converting module, coupled to one of the plurality of second protocol signal transceivers, is used for converting the protocol command signal into a driving command. Each system controller, coupled to one of the plurality of converting module, is used for generating data stream based on the driving command. The switch unit, disposed within the housing, is used for selecting a route to deliver the data stream from one of the plurality of converting modules. The console device may be used for displaying an operation interface based on the data stream.

In yet another aspect of the present invention, a keyboard and/or a cursor control device is coupled to the control management unit. The keyboard is used for generating a keyboard control signal, and the cursor control device is used for generating a cursor control signal. The switching unit further switches to another route to deliver the keyboard control signal from the keyboard to one of the plurality of electrical devices, or switches to another route to deliver the cursor control signal from the cursor control device to one of the plurality of electrical devices. The console device comprises a display and/or a mouse.

In still another aspect of the present invention, the communication interface is selected from a group consisting of a Bluetooth wireless network, an 802.11 series wireless network and a wireless USB interface.

The disclosed inventions will be described with reference to the accompanying drawings, which show important sample embodiments of the invention and which are incorporated in the specification hereof by reference.

DETAILED DESCRIPTION OF THE PREFERRED EMBODIMENT

Figure 1:
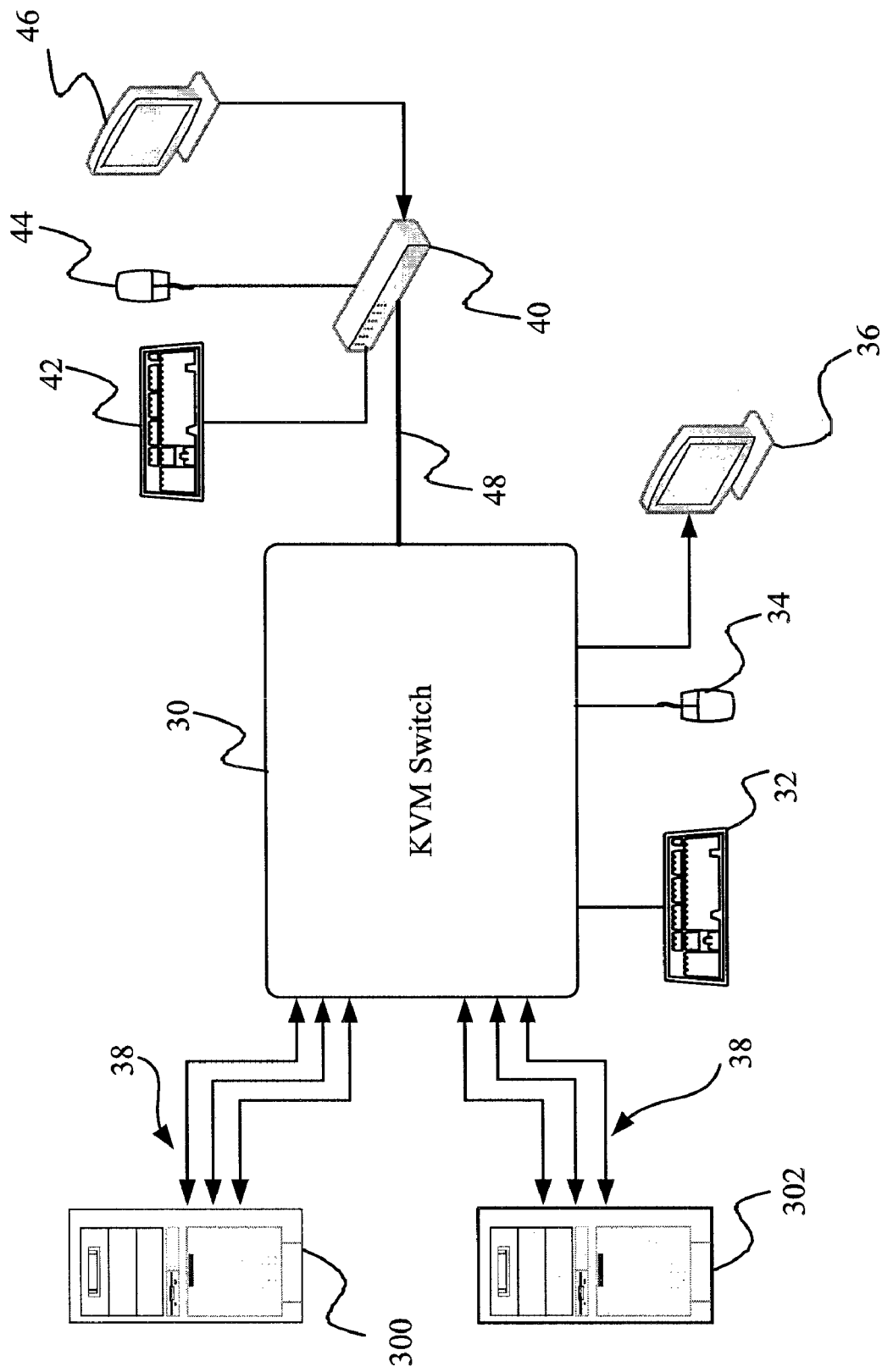
FIG. 1 illustrates a system of using a keyboard-video-mouse switch and a keyboard-video-mouse extender to transmit the keyboard/mouse data and receiving the video/audio data stream to/from the computer and with respective cables.
Figure 2:
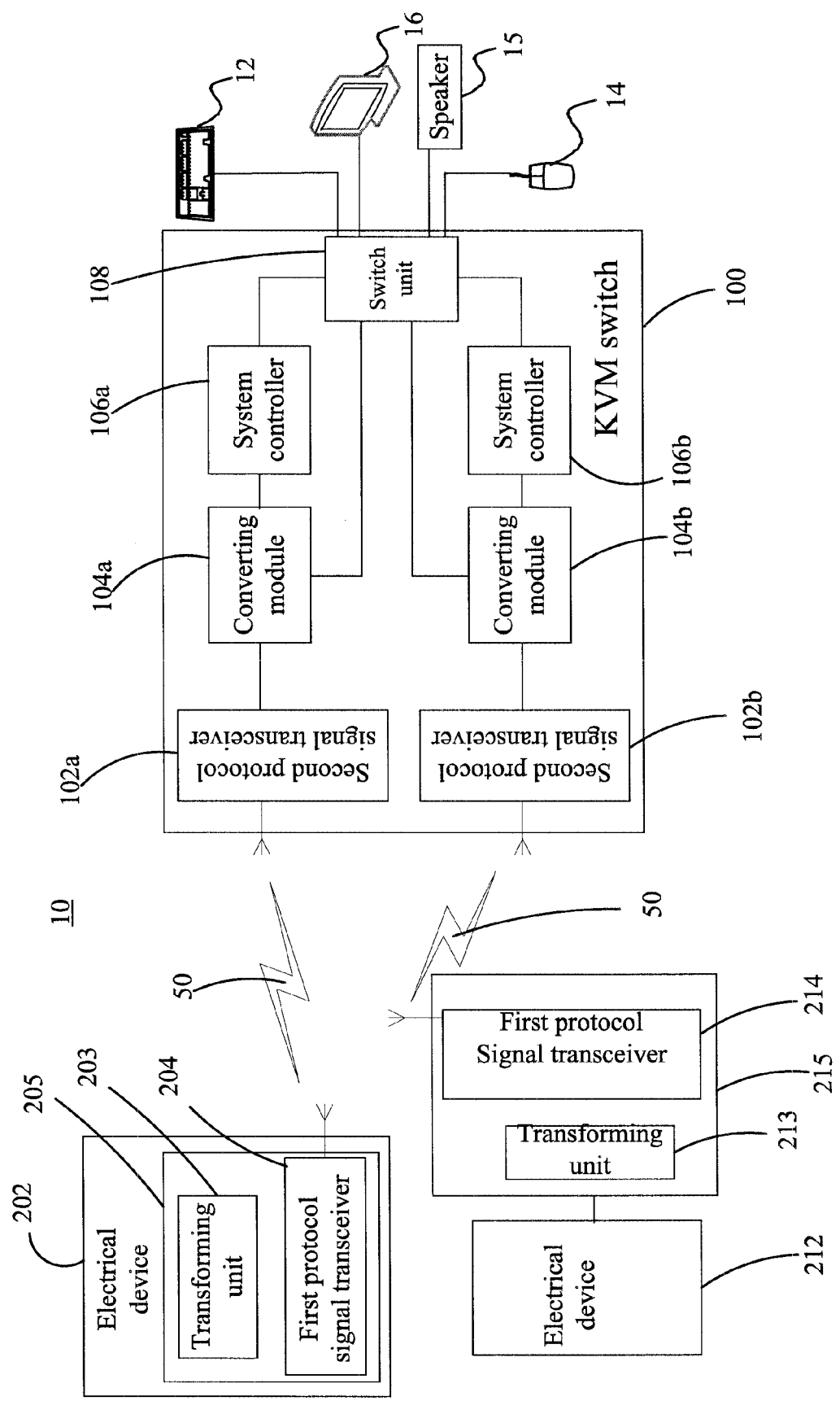
FIG. 2 illustrates a functional block diagram of an example of a control management system consistent with the present invention.

Please refer to FIG. 2, which illustrates a functional block diagram of an example of a control management system 10 consistent with the present invention. The control management system 10 is capable of remotely monitoring and controlling electrical devices 202 and 212 by means of a console for user's operation, which may comprise a keyboard 12, a cursor control device (e.g. a mouse 14 or a trackball), an audio device (e.g. a speaker 15 or a microphone), a display 16 or other console devices. A control management unit, i.e. a keyboard-video-mouse (KVM) switch 100, is coupled with the keyboard 12, the mouse 14, the audio device (i.e. the speaker 15), and the display 16, and is capable of wirelessly transmitting the keyboard/cursor control signal and receiving the driving command to/from the electrical devices (e.g. personal computers or personal digital assistants) 202 or 212 via a wireless communication interface 50.

Each of the electrical devices 202, 212 respectively corresponds to a host controller 205, 215. The host controller 205, 215 respectively comprises a transforming unit 203, 213, and a first protocol signal transceiver 204, 214. The transforming unit 203, 213 are used for generating a protocol command signal and transforming the protocol command signal into a USB or 1394 standard. The protocol command signal refers as a driving command. It is noted that the driving command is used for driving the graphic card, preferably not the RGB signal complying with VESA (Video Electronics Standard Association) standard, or is used for driving an audio card. The transforming unit 203, 213 may be implemented as a software installed in the operation system of the electrical devices 202, 212 or a hardware circuit.

The first protocol signal transceiver 204, 214 may be wireless cards with interfaces such as PCMCIA, USB, PCI, PCI-X or AGP. The first protocol signal transceiver 204, 214 are capable of packaging the protocol command signal with corresponding identification information, and outputting the packaged protocol command signal via the wireless communication interface 50. The identification information defines the name of the source electrical device, or other identification information (e.g., the IP address of the source electrical device). Both of the first protocol signal transceivers 204, 214 may enable the electrical devices 202, 212 to communicate utilizing the TCP/IP protocol. Furthermore, the wireless communication interface 50 could be implemented with the Bluetooth protocol, IEEE 802.11 series wireless network or wireless USB protocol. The 802.11 standard compatible wireless local area networks (WLANs) are often utilized in lieu of, or in conjunction with, local area networks. Further, the 802.11 standard enables communications over extended distances where the speed of the signal can automatically be reduced as the distance increases thus avoiding excessive degradation of the signal. Bluetooth devices are generally utilized for shorter range communication, utilizing lower transmission rates than 802.11 electrical devices. In addition, the wireless communication interface 50 may comply with a wireless USB protocol. The power utilization of the first protocol signal transceiver 204, 214 is also managed so as to comply with the USB specifications.

The KVM switch 100 comprises a plurality of second protocol signal transceivers 102a, 102b, a plurality of converting modules 104a, 104b, a plurality of system controllers 106a, 106b, and a switch unit 108. It should be noted that the plurality of second protocol signal transceivers 102a, 102b, the plurality of converting modules 104a, 104b, the plurality system controllers 106a, 106b, and the switch unit 108 may be disposed within a housing, and all of which are served as a part of a console. Each of the second protocol signal transceivers 102a, 102b corresponds to an assigned electrical device 202, 212. Significantly, the number of the second protocol signal transceivers are not specified as two as shown in FIG. 2, it depends on the capability to linking electrical devices of the KVM switch 100. In other words, three or more second protocol signal transceivers are also allowed if the KVM switch is designed to be linked to three or more electrical devices. Because each of the protocol command signals generated by the first protocol signal transceivers 204, 2114 contains an identification information which may includes the name of the its source electrical device, or other identification information (e.g., the IP address of the electrical device 202), so that only the corresponding second protocol signal transceiver 102a, 102b of the KVM switch 100 can identify the source of the protocol command signal based on the attached identification information. In other words, the identification information can be utilized in the routing of wireless data to the correct electrical device Accordingly, the second protocol signal transceiver 102a can identify the protocol command signal from the first protocol signal transceiver 204, whereas the second protocol signal transceiver 102b can identify the protocol command signal from the first protocol signal transceiver 214. As a result, the KVM switch 100 is configured to enable a user select among multiple electrical devices and wirelessly link to a selected electrical device for user interaction. In this control management system, the KVM switch 100 may initially develop a menu of a list of available electrical devices. A user may choose from this menu and the KVM switch 100 may establish a wireless connection with the corresponding electrical device.

The switch unit 108 can be implemented by a mechanism device or software program. During operation, the user may control the remote electrical device using the mouse 14, the keyboard 12, the speaker 15, and the display 16. The user may select a specific remote electrical device to access by pushing a button that corresponds with the desired electrical device, pressing one assigned hot key on the keyboard 12, or selecting the desired electrical device from a menu displayed on the display 16 by pointing to it or scrolling to it using the mouse 14 and/or the keyboard 12.

The converting modules 104a, 104b, respectively coupled to the second protocol signal transceivers 102a, 102b, are used for receiving the protocol command signal and for converting the protocol command signal into a driving command. The driving command may comply with a format of USB specifications, and then is delivered to a system controller 106a (or 106b).

Finally, upon the reception of driving command, the system controllers 106a, 106b are used for, based on the driving command, generating video data stream complying with VESA (Video Electronics Standard Association) standard, or audio data stream. The system controllers 106a, 106b transmit the video data stream to the display 16 or the audio data stream to and/or from the audio device (e.g. the speaker 15).

Figure 3:
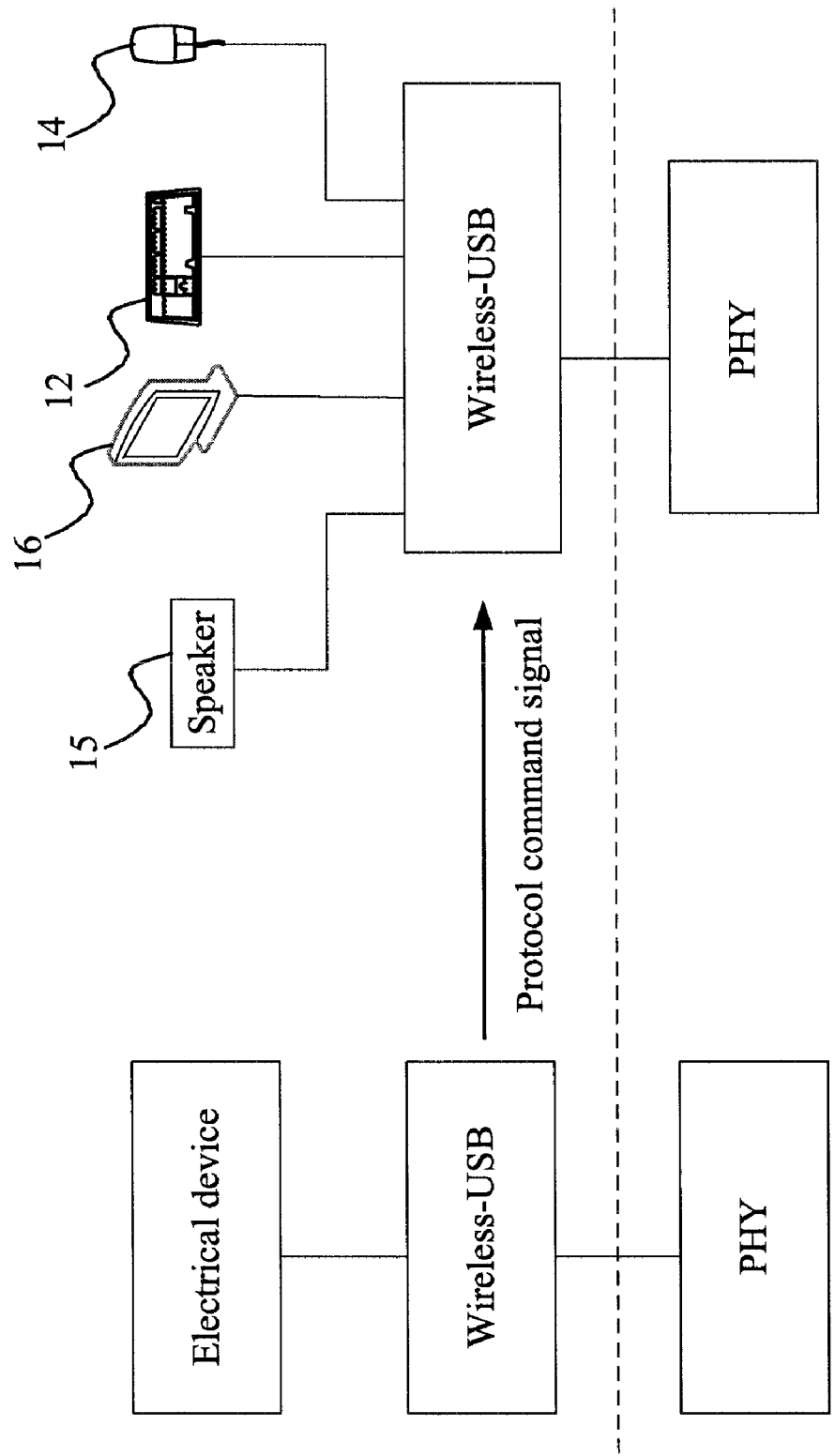
FIG. 3 illustrates a relationship of a transmission between the electrical device and the display, speaker, keyboard and a mouse coupled to the control management unit.

Please refer to FIG. 3, which illustrates a relationship of a transmission between the electrical device and a display, a speaker, a keyboard and a mouse coupled to the control management unit. Because USB standard requires strict adherence to these transaction latency and electrical requirements, which limits the USB extension distance, the USB requirements prevent the use of a KVM switch because a switch may degrade the USB signaling and further reduce the overall extension distance. Moreover, traditionally, before transmitting video data stream using VESA standard or audio data stream via PHY layer, the source electrical device generally utilize a compression algorithm, such as MPEG-2 or MPEG-4, to reduce and compress the digital data to reduce the necessary bandwidth required to transmit the video/audio data stream. However, it is very costly and complicated to design a hardware circuit or a software program for the compression algorithm. On the contrary, the electrical device of the control management system 10 generates a protocol command signal which comprises a driving command with less data load compared with the video/audio data stream. In this way, the bandwidth of wireless transmission of the driving command is less than that of wireless transmission of the video/audio data stream. Finally, the system controller functioning as graphic card or/and audio card can generate the video/audio data stream to the display and/or the speaker based on the driving command. In this way, the electrical devices lined to the KVM switch 100 can operate without installing a graphic card and/or an audio card therein.

In the example, an option menu with a list of available remote electrical devices may be displayed on the display 16. The option menu may also give the user the ability to manually adjust video settings to improve the quality of the transmitted video. In addition, the display 16 also can display a list associated with the identification information about electrical devices 202, 212 currently controlled by the keyboard 12, the mouse 14, and the display 16. In other words, the user may search for and select an electrical device via the menu shown on the display 16 which may refresh automatically as the electrical device 202, 212 enters or exits the wireless communication interface 50. Alternatively, the menu may refresh every time a user wishes to be interfaced with a different electrical device. Regardless of the type of wireless communication interface utilized, one of its primary purposes is to allow a user using the keyboard 12, the mouse 14, and the display 16 to select and subsequently control a remote electrical device.

As long as the user selects one electrical device by means of the menu displayed on the display 16, the switch 18 assigns the route to deliver the cursor control signal from the mouse 14 or the keyboard 12 to the converting module 104a, 104b, the second protocol signal transceiver 102a, 102b, and the desired electrical device 202, 212. For example, the user may remotely monitor the electrical device 202 by selecting an item relating to the desired electrical device 202 from a menu displayed on the display 16. The switch unit 108 may establish a route from the mouse 14 and/or the keyboard 12 to the converting module 104a. The converting module 104a converts the keyboard/cursor control signal into a keyboard/cursor protocol signal, and delivers it to the second protocol signal transceiver. As a result, the second protocol signal transceiver wirelessly sends the keyboard/cursor protocol signal to the first protocol signal transceiver corresponding to the electrical device 202. In this manner, the first electrical device is accordingly controlled by the keyboard/cursor control signal from the keyboard 12 and/or the mouse 14.

Figure 4:
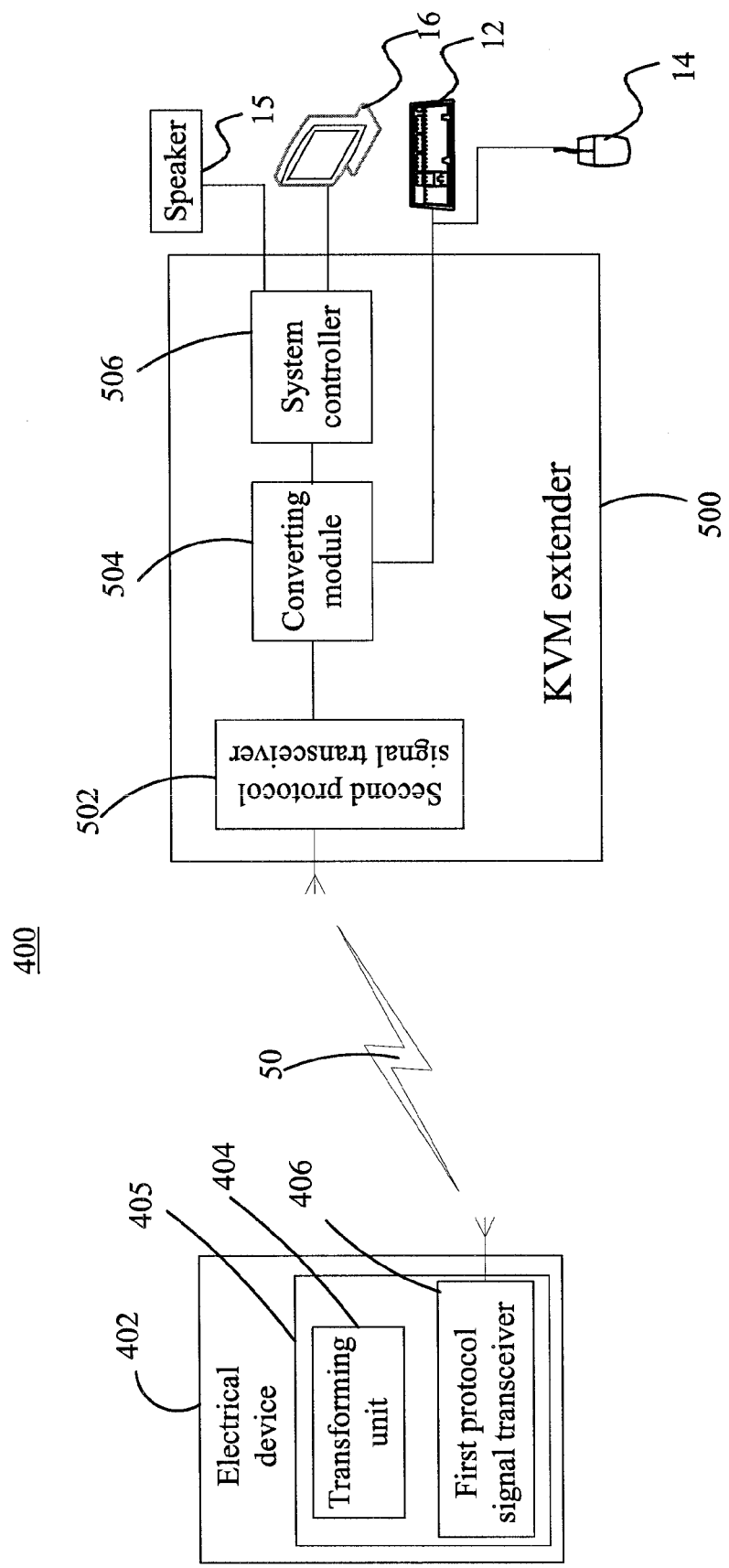
FIG. 4 shows a functional block diagram of another example of a control management system comprising an electrical device and a KVM extender consistent with the present invention.

Please refer to FIG. 4, which shows a functional block diagram of another example of a control management system 400 comprising an electrical device and a KVM extender consistent with the present invention. The control management system 400 is capable of remotely monitoring and controlling an electrical device 402 by means of a console for a user's operation, which may comprise a keyboard 12, a mouse 14, a display 16 and other console devices se. A keyboard-video-mouse (KVM) extender 500 is coupled with the keyboard 12, the mouse 14 and the display 16, and is capable of wirelessly transmitting the keyboard/mouse data and receiving the video driving command to/from the electrical devices (e.g. personal computers or personal digital assistants) 402 via a wireless communication interface 50. The electrical device 402 corresponds to a host controller 405 which has a transforming unit 404 for generating a protocol command signal, and a first protocol signal transceiver 406 for wirelessly transmitting the protocol command signal via the wireless communication interface 50. The communication interface 50 may be implemented with the 802.11 series wireless network, Bluetooth protocol or wireless USB protocol.

The keyboard-video-mouse extender 500 comprises a second protocol signal transceiver 502, a converting module 504, and a system controller 506. The second protocol signal transceiver 502 is used for receiving the protocol command signal from the first protocol signal transceiver 406. As it is, the KVM extender 500 has similar function as the KVM switch 100, except the switch unit 108. In other words, the first protocol signal transceiver 406 supplies the protocol command signal referring as a driving command and wirelessly transmits the protocol command signal to the second protocol transceiver 502. The converting module 504 is used for converting the protocol command signal into a driving command. The system controller 506 is used for generating data stream based on the driving command and outputting the data stream where it is displayed on the display 16. Thus, this system enables access of a single remote electrical device 402 through a wireless connection. In addition, because the system controller functioning as graphic card and audio card can generate the video/audio data stream to the display 16 and the speaker 15 based on the driving command, there is no need to install a graphic card or the audio card within the electrical device accordingly.

The present invention provides a wireless control management system for administrating electrical devices through a wireless-enabled KVM extender. Optionally, the electrical devices do not require an installation of the graphic card since the system controller is disposed within the KVM extender.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A control management system comprising:
a plurality of electrical devices, each electrical device corresponding to a transforming unit for generating a protocol command signal, and a first protocol signal transceiver for wirelessly transmitting the protocol command signal via a communication interface, wherein the protocol command signal carries a driving command for controlling a hardware device disposed in a Keyboard Video Mouse (KVM) switch; and
the KVM Switch comprising:
a plurality of second protocol signal transceivers, each second protocol signal transceiver corresponding to one of the first protocol signal transceivers, for receiving the protocol command signal from the corresponding first protocol signal transceiver;
a plurality of converting modules, each coupled to one of the plurality of second protocol signal transceivers, for converting the protocol command signal into the driving commend;
a system controller, coupled to one of the plurality of converting modules for generating an output data stream based on the driving command, wherein the hardware device is disposed in the system controller and is one of a graphic card and an audio card; and
a switch unit, for switching to a first route to deliver the output data stream from one of the plurality of converting modules to the system controller.

2. The control management system of claim 1, wherein one of the plurality of first protocol signal transceivers are disposed within one of the plurality of electrical devices.

3. The control management system of claim 1, wherein the communication interface is selected from a group consisting of a Bluetooth wireless network, an 802.11 series wireless network and a wireless Universal Serial Bus (USB) interface.

4. The control management system of claim 1, further comprising:
a cursor control device/keyboard coupled to the KVM Switch, for generating a cursor/keyboard control signal, wherein the switching unit further switches to a second route to deliver the cursor/keyboard control signal to one of the plurality of electrical devices.

5. The control management system of claim 4, wherein each of the plurality of converting modules is used for converting the cursor/keyboard control signal into a cursor/keyboard control signal, wherein the switching unit further switches to a second route to deliver the cursor/keyboard control signal to one of the plurality of electrical devices.

6. The control management system of claim 1, wherein the data stream is an audio data stream and the system controller is an audio device.

7. The control management system of claim 1, wherein the data stream is video data stream and the system controller is a display.

8. A control management system comprising:
an electrical device corresponding to a transforming unit for generating a protocol command signal, and a first protocol signal transceiver for wirelessly transmitting the protocol command signal via a communication interface, wherein the protocol command signal carries a driving command for controlling a hardware device disposed in a Keyboard Video Mouse (KVM) Switch;
the KVM Switch comprising:
a second protocol signal transceiver, for receiving the protocol command signal from the first protocol signal transceiver;
a converting module, for converting the protocol command signal into the driving command; and
a system controller, coupled to the converting module, for generating an output data stream based on the driving command, wherein the hardware device is disposed in the system controller and is one of a graphic card and an audio card, and outputting the output data stream to the system controller.

9. The control management system of claim 8, wherein the first protocol signal transceiver is disposed within the electrical device.

10. The control management system of claim 8, wherein the communication interface is selected from a group consisting of a Bluetooth wireless network, an 802.11 series wireless network and a wireless Universal Serial Bus (USB) interface.

11. The control management system of claim 8, further comprising:
a cursor control device/keyboard coupled to the KVM Switch for generating a cursor/keyboard control signal, wherein the KVM Switch further outputs the cursor/keyboard control signal to the electrical device.

12. The control management system of claim 11, wherein the converting module is used for converting the cursor/keyboard control signal into a cursor/keyboard protocol signal and each of the second protocol signal transceivers transmitting the cursor/keyboard protocol signal to the corresponding first protocol signal transceiver via the communication interface.

13. The control management system of claim 8, wherein the data stream is an audio data stream and the system controller is an audio device.

14. The control management system of claim 8, wherein the data stream is a video data stream and the system controller is a display.

15. A control management system, comprising:
a plurality of electrical devices, each electrical device corresponding to a transforming unit for generating a protocol command signal, and a first protocol signal transceiver for wirelessly transmitting the protocol command signal via a communication interface, wherein the protocol command signal carries a driving command for controlling a hardware device disposed in a Keyboard Video Mouse (KVM) Switch; and
the KVM Switch comprising:
a housing;
a plurality of second protocol signal transceivers, each second protocol signal transceiver corresponding to one of the first protocol signal transceivers and disposed within the housing, for receiving the protocol command signal from the corresponding first protocol signal transceiver;
a plurality of converting modules, each coupled to one of the plurality of second protocol signal transceivers and disposed within the housing, for converting the protocol command signal into the driving command;
a plurality of system controllers, each coupled to one of the plurality of converting modules and disposed within the housing, for generating an output data stream based on the driving command, wherein the hardware device is disposed in the system controllers and is one of a graphic card and an audio card;
a switch unit, disposed within the housing, for selecting a route to deliver the output data stream from one of the plurality of converting modules to the system controller.

16. The control management system of claim 15, wherein the communication interface is selected from a group consisting of a Bluetooth wireless network, an 802.11 serious wireless network and a wireless Universal Serial Bus (USB) interface.

17. The control management system of claim 15, further comprising:
a cursor control device/keyboard coupled to the console for generating a cursor/keyboard control signal wherein the console further outputs the cursor/keyboard control signal to the electrical device.

18. The control management system of claim 17, wherein each of the plurality of converting module is used for converting the cursor/keyboard control signal into a cursor/keyboard protocol signal, and each of the second protocol signal transceivers transmitting the cursor/keyboard protocol signal to the corresponding first protocol signal transceiver via the communication interface.

19. The control management system of claim 15, wherein the data stream is an audio data stream and the system controller is an audio device.

20. The control management system of claim 15, wherein the data stream is a video data stream and the system controller is a display.

21. The control management system of claim 1, wherein the system controller is the graphics card configured to generate the output data stream as a video signal output to a display device.

22. The control management system of claim 15, wherein one of the system controllers is the audio card configured to generate the output data stream as an audio signal output to a speaker.

* * * * *